United States Patent
Kley et al.

(10) Patent No.: US 8,671,680 B2
(45) Date of Patent: Mar. 18, 2014

(54) HYDRAULIC SYSTEM WITH IMPROVED PULSATION DAMPING

(75) Inventors: Ronald Kley, Seligenstadt (DE); Stefan Schmitt, Johannesberg (DE)

(73) Assignee: Continental Teves AG & Co. oHG (DE)

( * ) Notice: Subject to any disclaimer, the term of this patent is extended or adjusted under 35 U.S.C. 154(b) by 849 days.

(21) Appl. No.: 12/866,526

(22) PCT Filed: Feb. 4, 2009

(86) PCT No.: PCT/EP2009/051277
§ 371 (c)(1),
(2), (4) Date: Aug. 6, 2010

(87) PCT Pub. No.: WO2009/098235
PCT Pub. Date: Aug. 13, 2009

(65) Prior Publication Data
US 2010/0319334 A1  Dec. 23, 2010

(30) Foreign Application Priority Data
Feb. 8, 2008  (DE) .................. 10 2008 008 271
Jan. 30, 2009  (DE) .................. 10 2009 006 980

(51) Int. Cl.
*F15B 7/10* (2006.01)

(52) U.S. Cl.
USPC ............................................ 60/592; 60/469

(58) Field of Classification Search
USPC .................................................. 60/469, 592
See application file for complete search history.

(56) References Cited

U.S. PATENT DOCUMENTS

| | | | | |
|---|---|---|---|---|
| 5,058,961 A | * | 10/1991 | Mergenthaler et al. | 303/115.4 |
| 5,577,813 A | | 11/1996 | Zaviska | |
| 5,803,555 A | * | 9/1998 | Schaefer | 303/87 |
| 2003/0209940 A1 | * | 11/2003 | Inage et al. | 303/87 |

FOREIGN PATENT DOCUMENTS

| | | |
|---|---|---|
| DE | 26 43 860 | 3/1978 |
| DE | 31 33 111 | 4/1983 |
| DE | 42 34 013 | 4/1994 |
| DE | 103 03 251 | 9/2003 |
| DE | 10 2005 028 562 | 10/2006 |
| DE | 10 2006 033 775 | 12/2007 |

(Continued)

OTHER PUBLICATIONS

International Search Report for PCT/EP2009/051277 issued Apr. 24, 2009.

(Continued)

*Primary Examiner* — Edward Look
*Assistant Examiner* — Logan Kraft
(74) *Attorney, Agent, or Firm* — RatnerPrestia

(57) ABSTRACT

A hydraulic system comprising a receiving body with electrohydraulic valve, with at least one hydraulic pump, and with channels for connecting the pump to at least one hydraulic load. A pulsation situation arises as a result of the delivery of a pressure medium by the pump and/or as a result of pressure medium being withdrawn by the load. At least one damping unit is provided, having a plurality of pulsation damping means such as, in particular, a damping chamber, and orifice. The hydraulic system provides a uniform and cost-effective solution for different operating situations and prevents a decrease in comfort. The damping unit has at least one switching means for adjusting the action of said damping unit to a varied pulsation situation by connecting or disconnecting one or more damping means.

9 Claims, 6 Drawing Sheets

(56) References Cited

FOREIGN PATENT DOCUMENTS

| | | |
|---|---|---|
| EP | 0 407 721 | 1/1991 |
| GB | 1 590 003 | 5/1981 |
| GB | 2 242 948 | 10/1991 |

OTHER PUBLICATIONS

German Search Report for DE 10 2009 006 980.1 dated Apr. 30, 2009.

* cited by examiner

US 8,671,680 B2

HYDRAULIC SYSTEM WITH IMPROVED PULSATION DAMPING

CROSS REFERENCE TO RELATED APPLICATIONS

This application is the U.S. national phase application of PCT International Application No. PCT/EP2009/051277, filed Feb. 4, 2009, which claims priority to German Patent Application No. DE 10 2008 008 271.6, filed Feb. 8, 2008, and German Patent Application No. 10 2009 006 980.1, filed Jan. 30, 2009, the contents of such applications being incorporated herein by reference.

FIELD OF THE INVENTION

The invention relates to a hydraulic system with improved pulsation damping, comprising a receiving body with electrohydraulic valves, with at least one hydraulic pump, and with channels for connecting the pump to at least one hydraulic load, a pulsation situation arising as a result of delivery of pressure medium by the pump and/or as a result of withdrawal of pressure medium by the load, and there being provided at least one damping unit which comprises a plurality of pulsation damping means such as a damping chamber, elastic body and orifice.

BACKGROUND OF THE INVENTION

A hydraulic system of this type for use in a motor vehicle brake system is known, for example, from DE 10 2005 028 562 A1, which is incorporated by reference, wherein the pulsation damping means have differing configurations. Although the object is achieved in principle by this measure, the pulsation behavior continues to be capable of improvement. For example, the noise insulation in the interior of modern motor vehicles is optimized to such an extent that, for example, haptic feedback—such as, in particular, brake pedal vibration—intrudes especially negatively and is found objectionable.

Pulsation damping measures which are known in principle suffer from the disadvantage that they operate satisfactorily only at certain points.

ABS control interventions often take place at a braking pressure initiated by the driver of, for example, 100 bar and more and require a return delivery in the direction of the actuation unit THZ. Other interventions, such as the hydraulic operation of parking brake functions, require accelerated filling of brake calipers of comparatively large volume capacity, and therefore high volume flow with a comparatively low pressure level.

On the other hand, an optimized dosing capability combined with the highest possible NVH (Noise, Vibration and Harshness) comfort is demanded for assistance functions, which consequently require comparatively shallow pressure rise and/or pressure drop gradients in order to offer the highest possible comfort.

With regard to the volume flow delivery rate, the motor vehicle brake system is designed in principle in such a manner that the delivery capacity of the pump is dimensioned according to the maximum volume flow delivery required to cover especially safety-critical control interventions, such as stability control interventions (ESP), Anti-Rollover Protection (ARP) or the like. These interventions are based in principle on an autonomous system intervention without the ability to call on any support or prefilling by the vehicle driver. These marginal conditions require a comparatively large displacement volume (large piston diameter, long displacement stroke). This dimensioning has a negative effect in a pulsation evaluation and on noise behavior, especially when comparatively small delivery volumes are called for.

Furthermore, multi-circuit pumps predominantly have a jointly bundled drive train, so that all the pistons are constantly entrained during operation of the pump, even if no delivery flow is called for in any one of the pump circuits.

For example, if a delivery volume is withdrawn by the load from only one of two pump circuits, and if no delivery volume (zero delivery) is withdrawn from the other pump circuit, a negative pressure is formed (cavitation) in at least a part of the suction path of the pump circuit with zero delivery as a result of "suction throttled" operation. This is because the suction path of the pump is continuously closed. The negative pressure can liberate separated gas portions, leading to undesired compressibilities in the brake system.

SUMMARY OF THE INVENTION

It is an object of the present invention to develop generic hydraulic systems in such a manner that a unified and cost-effective solution is provided to the problems which arise at very different locations, and that a decrease in comfort as a result of the pulsation effect is prevented.

The present invention has an advantage that a situation-adjusted, automatic adaptation of the physical characteristics and effects of the damping unit to the prevailing pulsation characteristic is made possible. Because an automatic adaptation of the damper unit to an imposed pulsation characteristic takes place, therefore, no fixed working point of the damping unit is defined. As a result, pulsation reduction is improved, because the effect of the damping measure is extended over a widened operating range. This makes possible an extended range of action, which covers both high pressure applications with small delivery volumes and high delivery volumes with low pressure.

BRIEF DESCRIPTION OF THE DRAWINGS

Further details of the invention are apparent from dependent claims in conjunction with the description and with reference to the drawing, in which:

DETAILED DESCRIPTION OF THE INVENTION

Figures 1, 2:
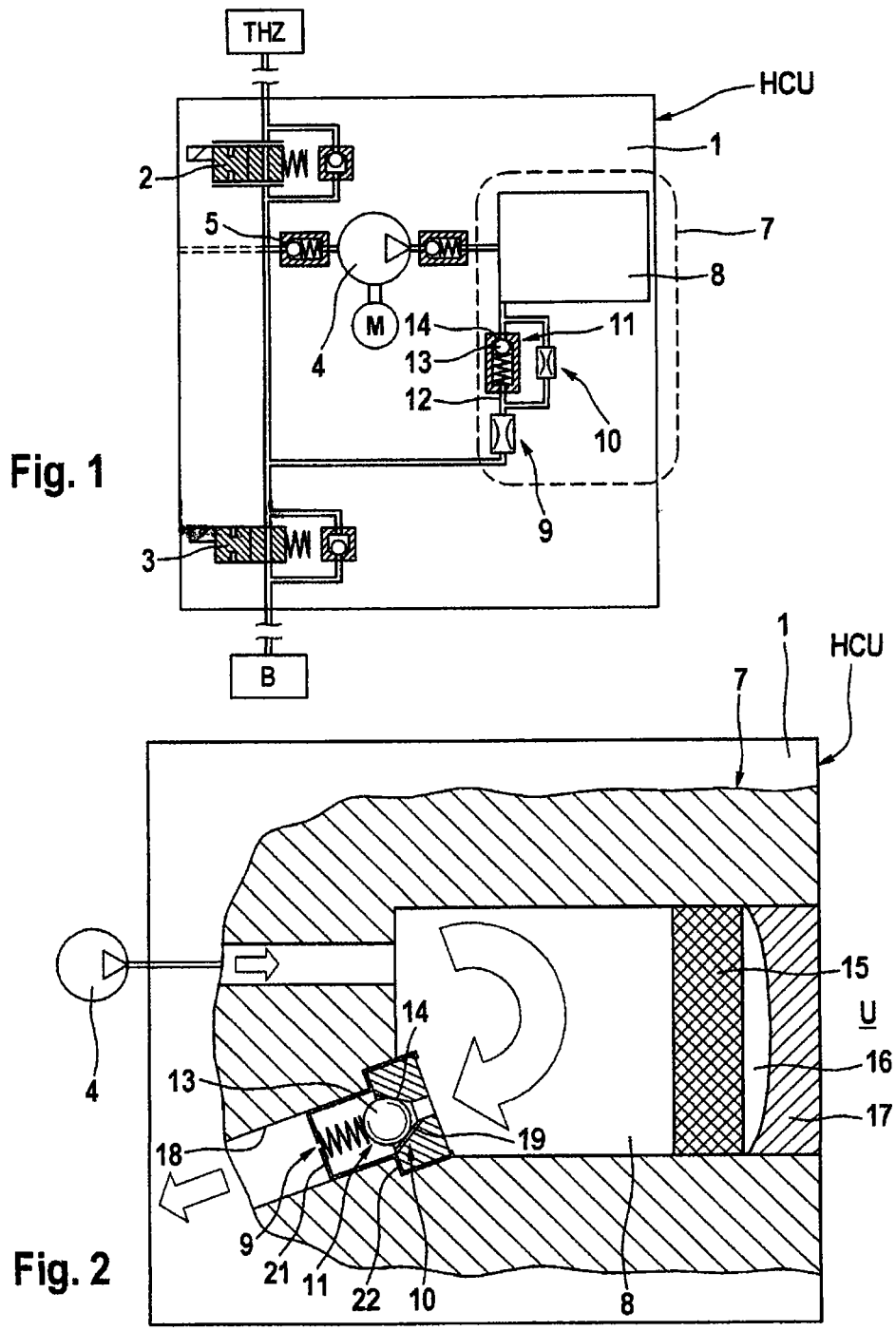
FIG. 1 shows in part a basic circuit diagram of a hydraulic circuit of a motor vehicle brake system with switchable damping unit.
FIG. 2 shows schematic, enlarged and, in part, constructional details of a modified damping unit.

FIG. 1 will be discussed in detail below. This figure shows schematically and partially a hydraulic system HCU with a receiving body 1 for electrohydraulic valves 2, 3 and a pump 4, which may be a reciprocating piston pump, which is arranged between an actuation unit THZ (master cylinder with reservoir) and wheel brakes B (load). The hydraulic system HCU makes possible a pressure modulation. The pump 4 is electric-motor driven. A speed variable motor M may be used, so that the delivery rate can be regulated. A suction path of the pump 4 includes an intake valve 5 which is controlled either by pressure differential or electromagnetically. In addition, the suction path is configured to be switchable by means of a currentlessly closed reversing valve (not shown) in such a manner that pressure medium can be drawn either from the actuation unit THZ or from a low-pressure accumulator (not shown), which in principle is connected to an outlet of a wheel brake B. Furthermore, the electrohydraulic valve 2 is designed as a currentlessly open block valve, so that driver-independent actuation is possible in the closed switching state, and conventional brake actuation can take place in the open state. The electrohydraulic valve 3 which can also be seen is designed in principle as a currentlessly open inlet valve for the wheel brake B.

The above-described switch-over in the suction path of the pump 4 enables pressure medium to be pumped either in the direction of the actuation unit THZ or in the direction of the wheel brake B, depending on the switching state. A pressure regulation valve 6 and an adaptively adjustable damping unit 7 comprising a plurality of damping means are arranged in the pressure path of the pump 4. In the schematically illustrated arrangement, a damping chamber 8 and an orifice unit connected downstream of the damping chamber 8 are provided. Very generally, the orifice unit comprises a fixedly installed orifice 9 and a switchable orifice 10. As is also symbolically apparent from FIG. 1, the orifice 9 has a large, relatively wide orifice opening with reduced throttling effect, while the orifice 10 has a small, comparatively narrow orifice opening with a high throttling effect. The adaptive adjustment of the damping unit 7 is effected by switching over. In the embodiment shown, this switching function is represented symbolically by a pressure-differential controlled nonreturn valve 11 which is arranged in parallel to the orifice 10 in a bypass 12 and which closes the bypass 12 in its normal position. The above-described damping unit 7, which is adjustable adaptively to the prevailing pulsation characteristic, makes possible automatic adaptation of the damping unit 7 to the prevailing pulsation conditions. In this context, at least two different switching states must be distinguished from one another.

a) If the pressure differential exerted on the nonreturn valve 11 is not sufficient to open same, the orifice 10 connected upstream, with small orifice opening, is always initially active. The volume flow then passes through the orifice 9 with large orifice opening. For this switching state the damping unit 7 causes a cascaded, or in other words serially connected, effect of the damping chamber 8 and of the two serially connected apertures 9, 10 with orifice openings of different sizes. The pressure medium then leaves the damping unit 7 and enters a pressure channel of the pressure path.

b) Above a sufficiently large pressure differential acting on an elastically preloaded valve body 13 of the nonreturn valve 11, the valve body 13 lifts from its valve seat 14, so that, after passing through the damping chamber 8, the pulsating volume flow passes directly through the orifice 9 with large orifice opening. In this case, the preloading force on the valve body 13 is specified such that, for example, a comparatively large pulsation effect triggers the switching process. As a result of this switching measure, the damping cascade which is formed comprises only the effect of the damping chamber 8 in combination with the effect of the orifice 9 with large through-opening.

One advantage of this adaptively acting damping unit 7 is that it can be integrated simply, with the necessary components, in modular large-volume production, making possible variably configured, adaptive pulsation damping in a simple manner by means of different embodiments equipped in modular fashion, without causing significant costs for modifying, for example, the electrohydraulic valves 2, 3, the receiving body 1, an electronic control system or other components. This is because components of the damping unit 7 can be simply added or omitted as required in the manner of a modular system.

The orifice openings of the two orifices 9, 10 may be of different dimensions. For example, they have very generally a comparatively small diameter of a few tenths of a millimeter. A graduation of the orifice openings may be within a range, for example, from approximately 0.2 mm to 0.5 mm (with up to +/−0.25 mm deviation in each case). Consequently, the orifice opening of the orifice 10 is dimensioned only approximately half as large in comparison to the orifice opening of the orifice 9.

Figure 3:
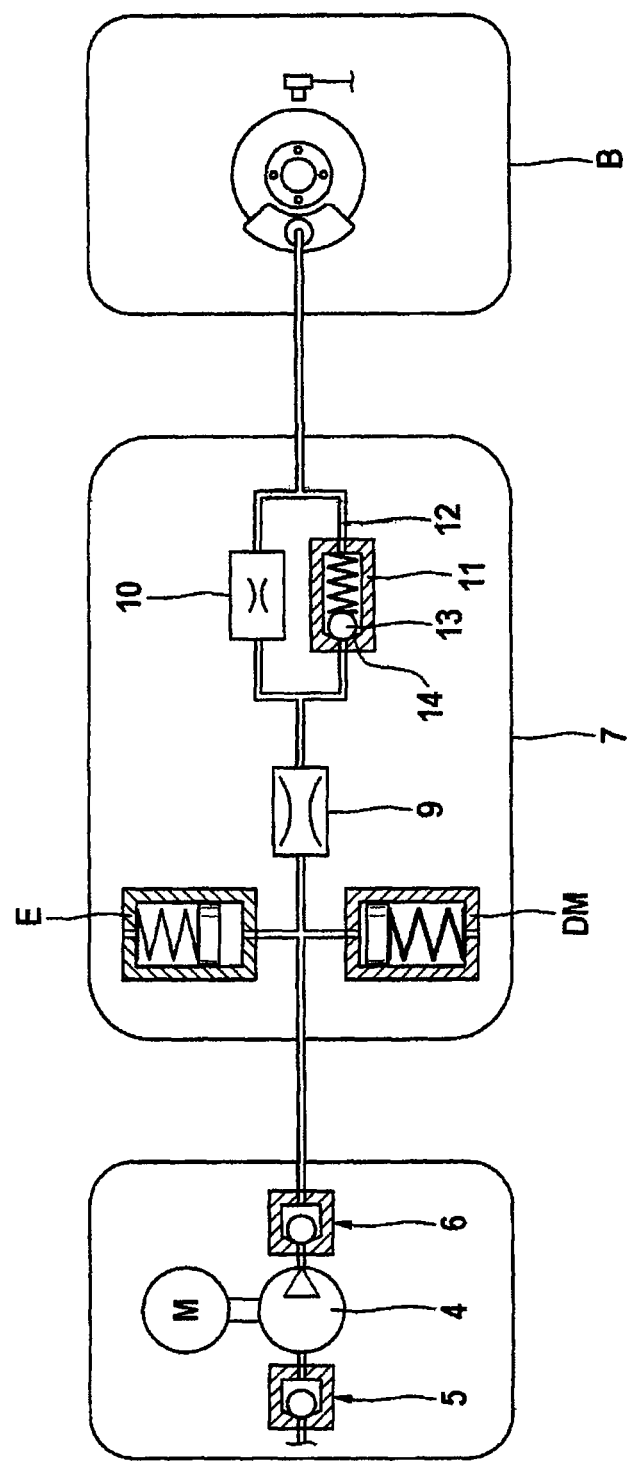
FIG. 3 shows a schematized circuit diagram comparable to FIG. 1.

Turning now to FIG. 3, the physical effects of the damping unit 7 are in principle as follows: The hydraulic pressure medium DM—although in principle incompressible—is initially slightly elastic, at least in the high-pressure range (elasticity of the pressure medium). A further, additional elasticity E is represented symbolically by separate damping means. In addition, the orifices 9, 10 with their respective orifice openings are dimensioned with regard to certain pulsation characteristics such that a certain banking-up pressure can be built up in the damping chamber 8, so that the damping chamber 8 makes available elasticity as a result of the pressure medium volume banked up therein. Now, an objective of the whole damping unit 7 consists in precisely coordinating its effect in such a manner that all the elasticities E, in conjunction with the banking-up pressure generated, cause a phase shift in relation to an excitation frequency produced by the pump 4 (which frequency corresponds to a rotational speed of the electric motor drive), such that the phase shift causes pulsation effects to be cancelled or at least reduced. Through the adaptive characteristic of the invention, this object is achieved even within the range of low drive frequencies, for example in the case of comfort functions.

Figure 6:
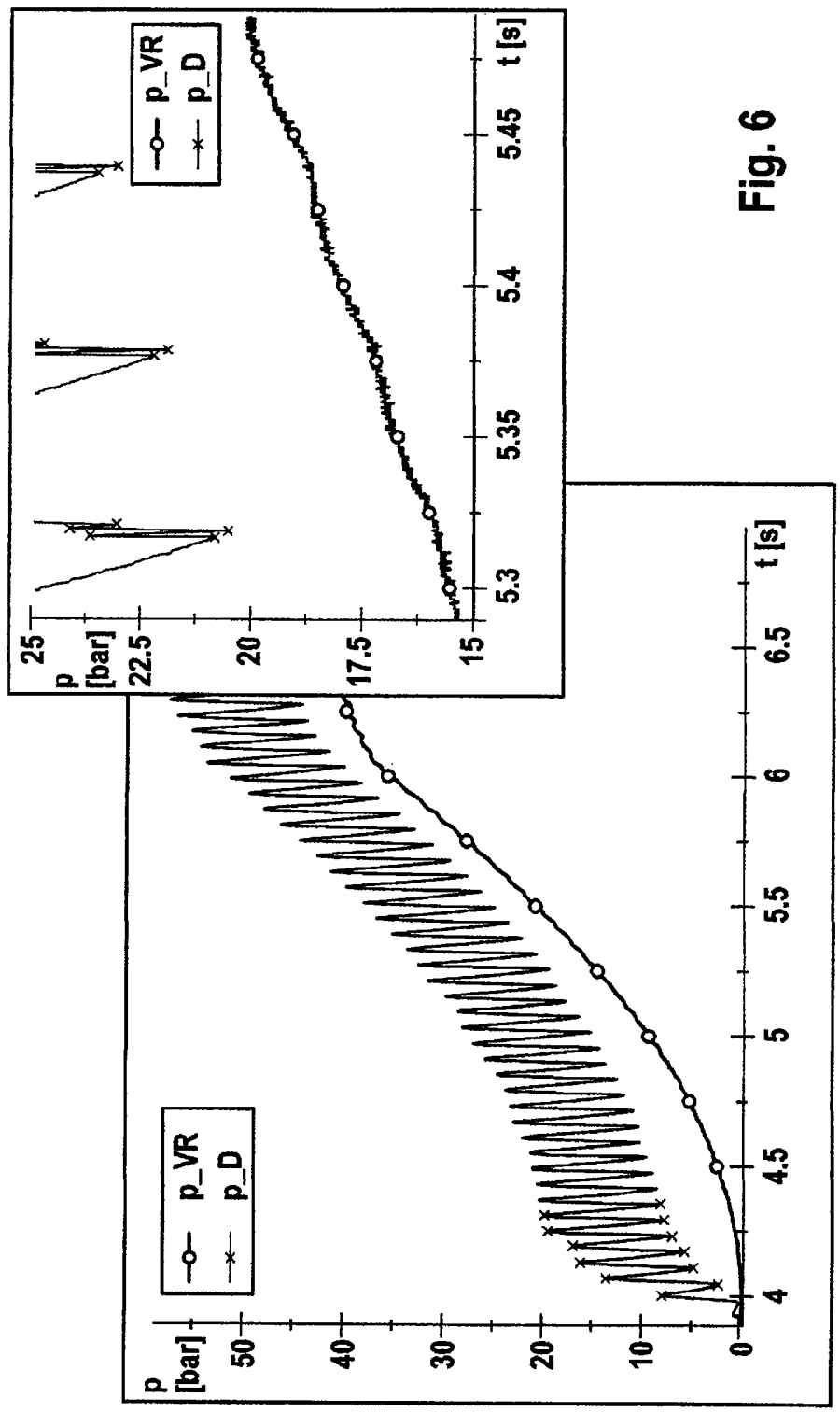
FIG. 6 shows pressure-time curves plotted for a damping unit and for a load with a hydraulic system according to aspects of the invention.

The mechanism of an especially successful cancellation or reduction can be seen in FIG. 6. The background is a cascaded throttling, which can be switched off, of a damping chamber 8 with a pressure medium volume of approximately 100 mm$^3$. In both pressure-time diagrams, the upper curve represents a respective pressure p_D in the damping chamber 8 and the lower curve represents a pressure p_VR in a wheel brake. The right-hand diagram in FIG. 6 illustrates a greatly smoothed wheel pressure curve p_VR with a considerable increase of the respective damping chamber pressure p_D in relation to the wheel pressure p_VR. From this there can be inferred a greatly increased banking-up pressure, which causes the phase shift illustrated. As a result, the wheel pressure curve shows substantially no unevenness.

Figure 7:
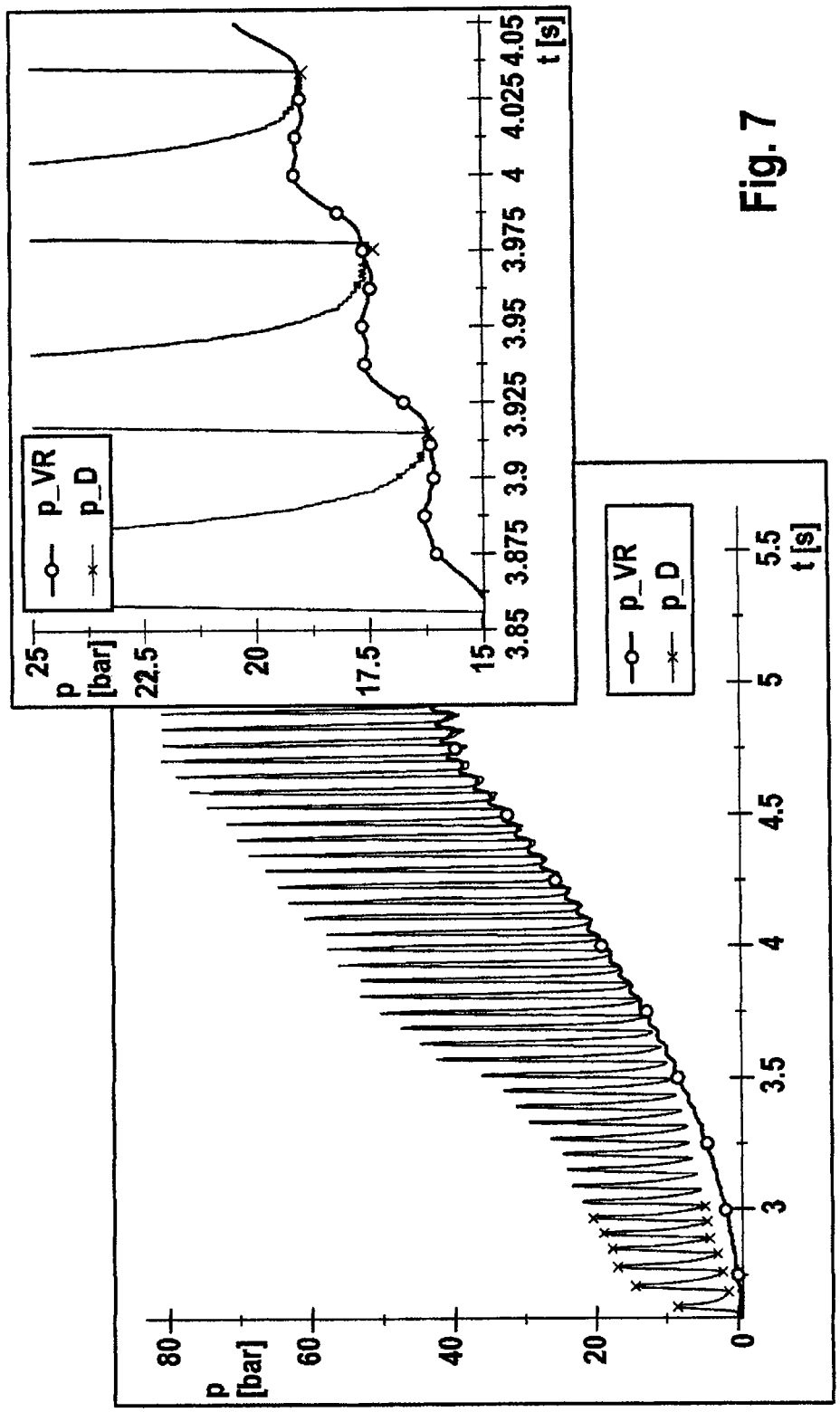
FIG. 7 shows pressure-time curves plotted for a damping chamber and for a load with a conventional hydraulic system.

In contrast, a damping system according to FIG. 7 is not based on the invention but only on a cascaded throttling of an elastomer membrane 15 of approximately 60 Shore hardness (without the use of a damping chamber). An uneven, staircase-like wheel pressure curve p_VR can be seen in the right-hand diagram of FIG. 7, the damping chamber pressure p_D falling at some points to the level of the wheel pressure p_VR. This documents a damping function of the damping unit used which is unsatisfactory in wide regions.

Figure 4:
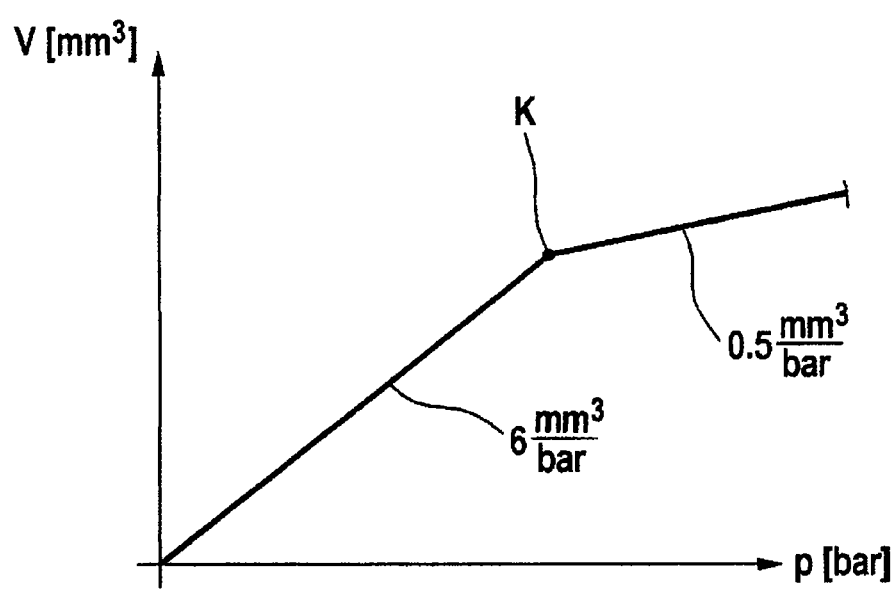
FIG. 4 shows a schematized characteristic curve to illustrate the adaptively adjusted damping effect of a damping unit.

In the diagram according to FIG. 4, a characteristic curve of a volume absorption V in mm$^3$ is plotted qualitatively as a function of the pressure p in bar in the case of a damping unit 7 according to aspects of the invention. Accordingly, FIG. 4 illustrates the elasticity E available in each case. A kink K in the volume characteristic curve clearly shows that the elasticity, and therefore the throttling effect, is reduced under high system pressure by the switching process described, so that the volume absorption in the damping chamber 8 is reduced. For example, the elasticity (gradient of the characteristic curve) is, for example, approximately 6 mm$^3$/bar in a first section and approximately 0.5 mm$^3$/bar in a second section.

Very generally, it is advantageous if the maximum banking-up pressure is limited, since excessively high banking-up pressure in the damping chamber 8 causes increased current consumption and increased wear of the crank drive through hydraulic reactions on the piston and drive eccentric. For this reason the bypass 12 is provided with the nonreturn valve 11, which limits the maximum banking-up pressure generated. The opening pressure of the nonreturn valve 11 may be selected smaller, the more elastic the coordination of the whole system (coordination of damping chamber 8, orifices 9, 10 and elasticity/pressure medium).

Corresponding constructional elements in FIG. 2 are designated by corresponding reference numerals. In addition, an elastic membrane 15 which separates the fluid-filled damping chamber 8 from a pneumatic chamber 16 is arranged in the damping chamber 8. According to an embodiment, the pneumatic chamber 16 may be separated from the ambient atmosphere U by a closure 17. Alternatively, a pressure equalization takes place between the pneumatic chamber 16 and the ambient atmosphere U. The two orifices 9, 10 and the nonreturn valve 11 are in the form of an assembly which can be handled separately, and can be inserted, starting from a receiving bore of the damping chamber 8, in a stepped bore 18 of the pressure channel. In order to form the orifice 10, the valve seat 14 has a specified chamfer 19, the cross section of which corresponds to the orifice opening. In order to prevent blockage of fine bores, such as blockage of the orifice opening, a filter 20 (cf. FIG. 5) may be positioned upstream thereof. In order to implement same, an orifice 9 may be provided at the centre of a base 21 of a housing 22 opposite the valve seat 14 (FIG. 1).

Figure 5:
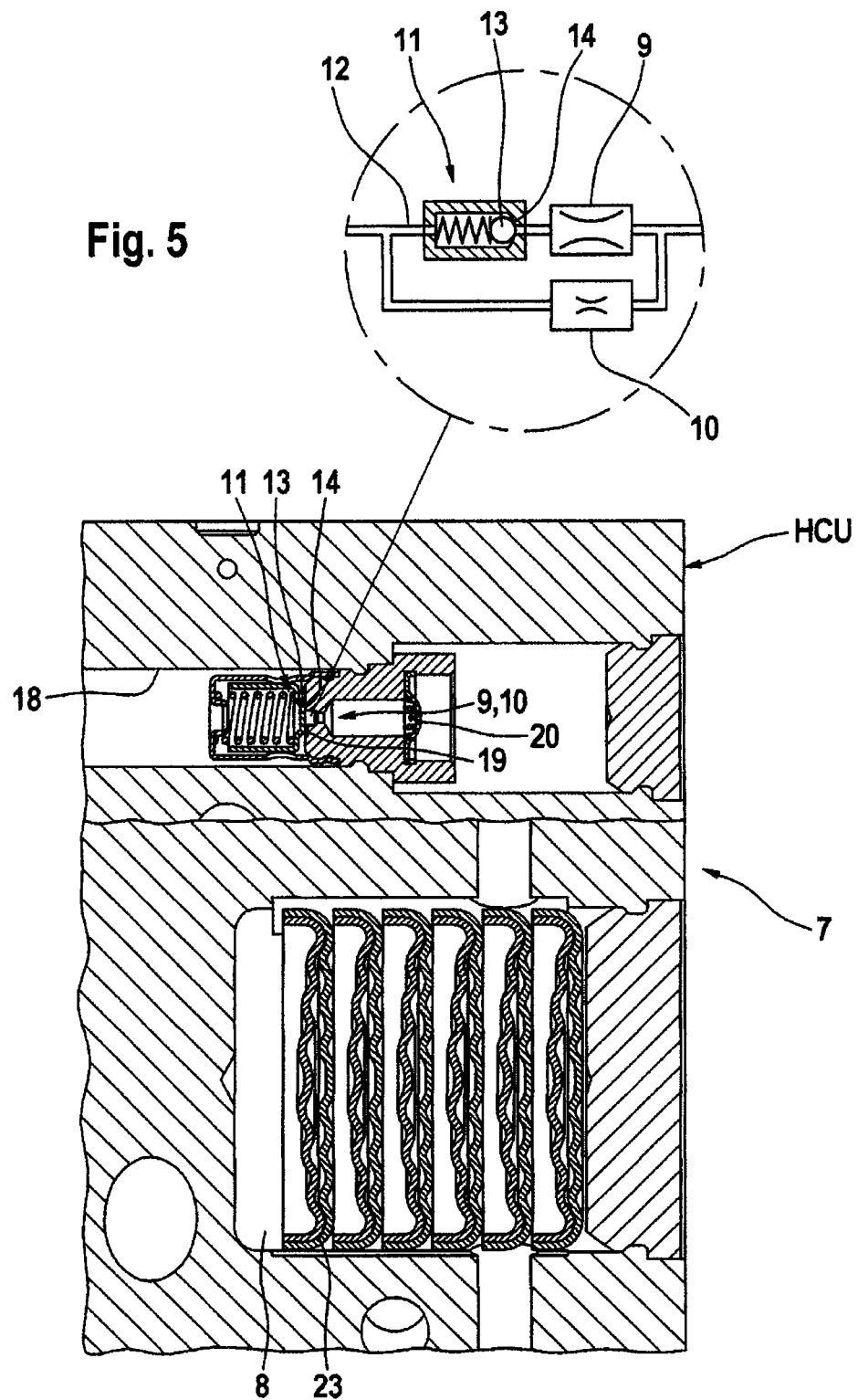
FIG. 5 shows parts of a hydraulic system with a damping unit in an enlarged sectional view according to a first embodiment.

Alternatively—as shown in FIG. 5—a channel-shaped or slot-shaped orifice opening (chamfer 19) is provided between valve body 13 and valve seat 14, and the enlarged orifice opening is created as the valve body 13 lifts from the valve seat 14 (FIG. 5). This construction is distinguished by the fact that the cross section of the orifice 9 can even be adjusted variably as a function of the pressure differential acting thereon, whereas according to FIG. 2 a fixed value is always defined. In other words, it is entirely possible to configure either the orifice 9 or the orifice 10 to be variable.

In addition, the switching logic can be implemented differently, for example as in FIG. 1, in that the orifice 10 is switched off because a nonreturn valve 11 opens the bypass 12, or the orifice 10 is opened as a function of pressure in the manner of a switching orifice (FIG. 2).

The damping unit 7 may have self-cleaning properties in that fine orifice bores are flushed free in operation during phases of relatively high pressures/drive speeds. If dirt particles block any orifice openings completely during low pressure phases, the pressure in the damping chamber 8 automatically rises and the nonreturn valve 11 opens. Overloading of the pump 4 is therefore prevented, safe operation continues to be ensured and the fine orifice 9 is cleaned during phases of high pressure (self-curing behavior).

A further, modified embodiment of the invention can be seen in FIG. 5. In order to shape the volume-pressure behavior of the damping chamber 8 as required, a plurality of metal elastic bodies 23 are accommodated in the damping chamber 8. The elastic bodies 23 may be in a form, for example, like that of a hermetically sealed, compressible barometric cell. The elastic bodies 23 serve to influence and produce the desired elasticity E. A further advantage is that, as a result of the volume absorption, relatively little brake fluid volume needs to be introduced into the receiving body, and that a defined elasticity is provided at the same time.

The invention claimed is:

1. A hydraulic system, comprising a receiving body with electrohydraulic valves, with at least one hydraulic pump, and with channels for connecting the pump to at least one hydraulic load, a pulsation situation arising as a result of delivery of pressure medium by the pump and/or as a result of withdrawal of pressure medium by the load, and there being provided at least one damping unit which comprises a plurality of pulsation damping means wherein the damping unit includes at least one switching means in order to adapt the effect of said damping unit to a changed pulsation situation by switching one or more damping means on or off,
wherein the switching means comprises a valve having an opening, the opening having a cross-section configured to vary as a function of a pressure differential across the valve.

2. The hydraulic system of claim 1, wherein the plurality of pulsation damping means comprises a damping chamber or orifice.

3. The hydraulic system of claim 1, wherein the pulsation damping means is connected in parallel to the valve.

4. The hydraulic system of claim 3, wherein the switching means is in the form of an electromagnetically switched valve.

5. The hydraulic system of claim 3, wherein the switching means is in the form of a hydraulically switched valve.

6. The hydraulic system of claim 4, wherein the valve is in the form of a nonreturn valve, in that the nonreturn valve has an integrated orifice and wherein the nonreturn valve has a predetermined opening pressure, the valve body being subjected to a defined preloading force.

7. The hydraulic system as claimed in claim 6, wherein the nonreturn valve is closed in the normal state, and wherein the predetermined opening pressure is adjusted in order to bypass or switch out of operation the pulsation damping means connected in parallel.

8. The hydraulic system as claimed in claim 2, wherein the orifice is in the form of a channel or chamfer in a valve seat.

9. The hydraulic system as claimed in claim 2, wherein the damping chamber accommodates one or more elastic bodies.

* * * * *